Patented Mar. 1, 1949

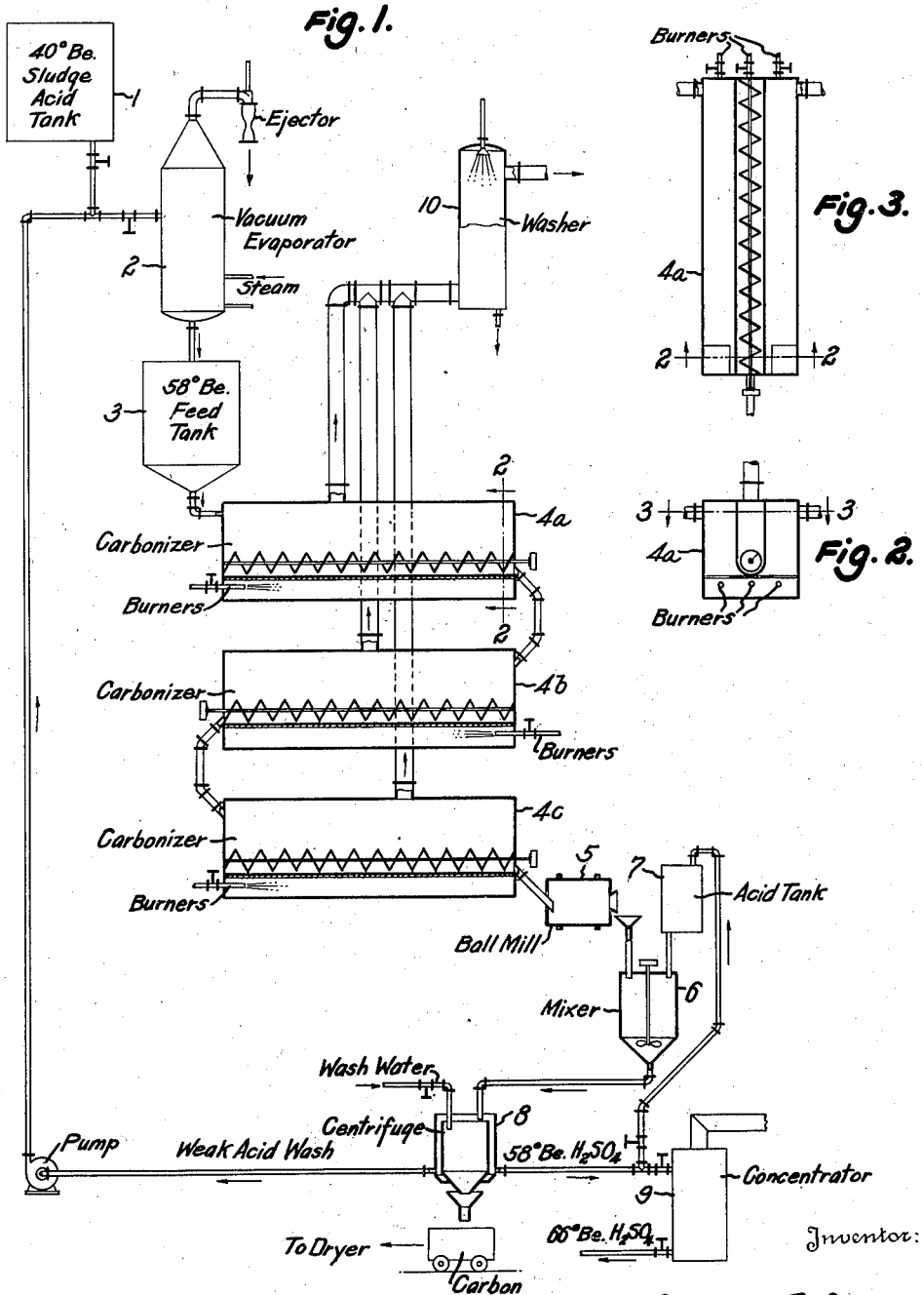

2,463,204

UNITED STATES PATENT OFFICE 2,463,204

RECOVERY OF SLUDGE ACIDS

Gustave T. Reich, Philadelphia, Pa.

Application July 23, 1942, Serial No. 452,103

2 Claims. (Cl. 23—173)

This invention relates to the reclaiming or recovery of sludge acids obtained in the refining or other treatment of petroleum oils, or their fractions or derivatives, with sulfuric acid.

Because of the relatively low strength of the sludge acids and the relatively high proportion of organic matter which they contain, the recovery of the values from such acids has presented a difficult technical problem.

It has been proposed to evaporate the sludge acid under vacuum to a point where it starts to foam, to then blow air through the acid to oxidize the sulfonated organic compounds which cause the foaming, and thereafter to finish the concentration to acid of 66° Bé. The process requires the use of large size treatment apparatus because of the foaming, the removal of the organic compounds is slow and a large amount of the sulfuric acid is decomposed.

It has also been proposed to vaporize the entire acid sludge to convert the sulfuric acid into sulfur dioxide which is then reconverted to sulfuric acid by the known methods. This is an expensive process and, in effect, is a recovery of the relatively cheap sulfur content of the sludge acid rather than a recovery of its more valuable sulfuric acid content which is destroyed in the process.

I have now found that the technical difficulties in the recovery of sludge acids may largely be avoided, a large proportion of the acid content can be recovered as a high grade acid, and a substantial amount of carbon, useful, for example, as fuel in operating the process, can be obtained, by means of the novel method of operation hereinafter described.

The method of the invention comprises concentrating the sludge acid under a vacuum to a concentration having a boiling point under atmospheric pressure substantially above the temperature of charring and thereafter heating the sludge acid at a temperature at least as high as the charring temperature but substantially below the boiling point until charring is substantially complete. In this way the organic substances in the acid are substantially completely decomposed and converted into a form of carbonaceous substance which is readily separated from the acid, leaving an acid which can be concentrated to commercial strength without troublesome foaming or decomposition. Advantageously, the acid after charring is diluted to facilitate separation of the carbon, preferably by mixing with acid of about the same concentration, for example, a portion of previously separated acid, thereby avoiding any dilution of the acid with water which would increase the cost of the subsequent reconcentration. However, if desired, water or weak acid may be used for the dilution.

For the purpose of illustration the invention will be more particularly described with reference to the accompanying drawing diagrammatically illustrating a suitable plant for operating the method of the invention.

In the drawing:

Fig. 1 is a diagrammatic layout of a plant for practicing the invention;

Fig. 2 is a vertical section through one of the carbonizing retorts on line 2—2 of Fig. 1, and Fig. 3 is a horizontal section on line 3—3 of Fig. 2.

Sludge acid, of for example, 30 to 40° Bé., from tank 1 is fed into vacuum evaporator 2 where it is concentrated to about 58°-60° Bé. under a vacuum sufficient to keep the temperature of evaporation below the charring temperature. For example, at 26 inches of vacuum the boiling point of 60° Bé. sulfuric acid is substantially below the charring temperature of a typical sludge acid at that concentration.

The partially concentrated sludge acid is then fed, preferably continuously, from tank 3 successively through carbonizing retorts 4a, 4b, 4c wherein the acid is heated at atmospheric pressure to a temperature above the charring temperature but below the boiling point. Preferably, the temperature of the retorts is progressively increased, being maintained, for example, at 300° F. in retort 4a, at 330° F. in retort 4b, and at 360° F. in retort 4c.

The carbonizing retorts may advantageously be constructed in accordance with the principles disclosed in my United States Patents Nos. 1,698,171 and 1,823,408, using, of course, materials of construction adapted to the acid substances being handled. The three or more carbonizing retorts may be enclosed in a common heating chamber, heated solely or preponderantly at the bottom, so that the temperature of the retorts increases from top to bottom in the direction of acid flow. Gases from the retorts are advantageously passed through scrubber 10 before passing to the atmosphere.

In the carbonizing retorts, substantially all of the organic substances in the sludge acid are converted into a carbonaceous substance or coke. The acid containing the char or coke coming from the retorts is preferably passed through a ball mill 5 to grind the char to a uniform finely divided state and the ground acid-char mix is then mixed in mixer 6 with, for example, an equal volume of acid of approximately the same strength, preferably previously separated acid, from tank 7.

The carbon is then separated from the acid, for example, in centrifuge 8. A portion of the separated acid is returned to tank 7 and the remainder passes to concentrator 9 where it is concentrated to commercial strength. Any further char which is formed in the further concentration may be separated from the concentrated acid, by settling or filtration, but, in general, it will be so small in amount that the concentrated acid may be used directly in petroleum refining or treating operations.

The carbon in the centrifuge 8 is washed substantially acid-free with water. The acid wash liquor is returned to vacuum concentrator 2 and the carbon is dried for any desired use.

While the particular concentrations and temperatures at which the process is carried out will naturally vary with the particular sludge acid being treated, in general, the acid may be concentrated under vacuum to a concentration of from about 55° Bé. to about 60° Bé. and the charring operation may be effected at temperatures between about 250° and 400° F. At these temperatures the charring reaction takes place very rapidly so that the corrosive action of the sulfonic acid compounds contained in the sludge acid is negligible, thus making it possible to utilize less expensive equipment, both as to materials of construction and simplicity of design. The size of the apparatus required for a given capacity is also substantially reduced.

I claim:

1. A method of recovering sludge acid which comprises concentrating the acid under vacuum to a concentration having a boiling point under atmospheric pressure substantially above its temperature of charring, thereafter heating the acid at a temperature at least as high as its charring temperature but substantially below its boiling point until charring is substantially complete, mixing the acid with a substantial proportion of sulfuric acid of approximately the same concentration, and separating the carbonaceous material therefrom.

2. A method of recovering sludge acid which comprises concentrating the acid under vacuum to a concentration having a boiling point under atmospheric pressure substantially above its temperature of charring, thereafter heating the acid at a temperature at least as high as its charring temperature but substantially below its boiling point until charring is substantially complete, mixing the acid with a substantial proportion of sulfuric acid of approximately the same concentration, separating the carbonaceous material therefrom, and further concentrating the separated acid.

GUSTAVE T. REICH.

REFERENCES CITED

The following references are of record in the file of this patent:

UNITED STATES PATENTS

| Number | Name | Date |
|---|---|---|
| 1,257,895 | Leitch | Feb. 26, 1918 |
| 1,263,950 | Slater | Apr. 23, 1918 |
| 1,361,940 | Webster | Dec. 14, 1920 |
| 1,384,978 | Simonson et al. | July 19, 1921 |
| 1,415,443 | Hechenbleikner | May 9, 1922 |
| 1,423,766 | Hechenbleikner | July 25, 1922 |
| 1,844,513 | Mantius | Feb. 9, 1932 |

FOREIGN PATENTS

| Number | Country | Date |
|---|---|---|
| 361,509 | Great Britain | Nov. 26, 1931 |